(12) United States Patent
Sharma et al.

(10) Patent No.: US 8,722,789 B2
(45) Date of Patent: May 13, 2014

(54) POLY(ARYLENE ETHER) COMPOSITION, METHOD, AND ARTICLE

(75) Inventors: Kirti Sharma, Bergen op Zoom (NL); Abhijit Namjoshi, Midland, MI (US)

(73) Assignee: Sabic Innovative Plastics IP B.V. (NL)

( * ) Notice: Subject to any disclaimer, the term of this patent is extended or adjusted under 35 U.S.C. 154(b) by 271 days.

(21) Appl. No.: 13/229,066

(22) Filed: Sep. 9, 2011

(65) Prior Publication Data
US 2013/0046046 A1 Feb. 21, 2013

Related U.S. Application Data

(60) Provisional application No. 61/524,810, filed on Aug. 18, 2011.

(51) Int. Cl.
*C08F 283/08* (2006.01)
*C08K 5/00* (2006.01)

(52) U.S. Cl.
USPC .......................................... 524/508; 524/145

(58) Field of Classification Search
USPC .......................................................... 524/508
See application file for complete search history.

(56) References Cited

U.S. PATENT DOCUMENTS

| | | | |
|---|---|---|---|
| 2,933,480 | A | 1/1960 | Gresham et al. |
| 3,093,621 | A | 6/1963 | Gladding |
| 3,211,709 | A | 10/1965 | Adamek et al. |
| 3,306,874 | A | 2/1967 | Hay |
| 3,646,168 | A | 2/1972 | Barrett |
| 3,790,519 | A | 2/1974 | Wahlborg |
| 3,884,993 | A | 5/1975 | Gros |
| 3,894,999 | A | 7/1975 | Boozer et al. |
| 4,059,654 | A | 11/1977 | Von Bodungen et al. |
| 4,166,055 | A | 8/1979 | Lee, Jr. |
| 4,433,088 | A | 2/1984 | Haaf et al. |
| 4,584,334 | A | 4/1986 | Lee, Jr. et al. |
| 4,966,814 | A | 10/1990 | Ohzeki |
| 5,145,877 | A | 9/1992 | Bopp et al. |
| 5,264,487 | A | 11/1993 | Scobbo, Jr. et al. |
| 5,420,200 | A | 5/1995 | Koning et al. |
| 5,561,186 | A | 10/1996 | Nagaoka et al. |
| 5,635,556 | A | 6/1997 | Rosenthal |
| 5,772,041 | A | 6/1998 | Kertscher et al. |
| 5,894,996 | A | 4/1999 | Williams |
| 5,951,940 | A | 9/1999 | Nosket et al. |
| 6,025,419 | A | 2/2000 | Kasowski et al. |
| 6,054,516 | A | 4/2000 | Yoshida et al. |
| 6,166,137 | A * | 12/2000 | Brown et al. ................. 525/133 |
| 6,262,166 | B1 | 7/2001 | Yoshida et al. |
| 6,274,637 | B1 | 8/2001 | Schallenberg |
| 6,426,474 | B1 | 7/2002 | Maehata et al. |
| 6,469,098 | B1 | 10/2002 | Okada et al. |
| 6,522,149 | B2 | 2/2003 | Yokoyama et al. |
| 6,588,597 | B2 | 7/2003 | Arakane et al. |
| 6,737,459 | B2 | 5/2004 | Ebisawa et al. |
| 7,037,951 | B2 | 5/2006 | Inagaki |
| 7,790,791 | B2 | 9/2010 | Culligan |
| 7,884,140 | B2 | 2/2011 | Riise et al. |
| 7,964,675 | B2 | 6/2011 | Ko et al. |
| 8,025,158 | B2 | 9/2011 | Delsmann et al. |
| 8,057,873 | B2 | 11/2011 | Levasalmi |
| 2005/0148708 | A1 | 7/2005 | Ahn et al. |
| 2005/0228131 | A1 | 10/2005 | Jang et al. |
| 2005/0228136 | A1 | 10/2005 | Ko et al. |
| 2009/0269659 | A1 * | 10/2009 | Levasalmi ..................... 429/163 |
| 2011/0003962 | A1 | 1/2011 | Carrillo et al. |
| 2012/0298548 | A1 * | 11/2012 | Riding ......................... 206/703 |

FOREIGN PATENT DOCUMENTS

| | | |
|---|---|---|
| EP | 442102 A1 | 8/1991 |
| JP | 09087511 | 3/1997 |
| JP | 2000159900 | 6/2000 |
| JP | 2002292628 A | 10/2002 |
| WO | 9222608 A1 | 12/1992 |
| WO | 9808898 A1 | 3/1998 |
| WO | 03028998 A1 | 4/2003 |
| WO | 03087215 A1 | 10/2003 |
| WO | 2009104107 A1 | 8/2009 |

OTHER PUBLICATIONS

U.S. Appl. No. 13/229,066, filed with the USPTO on Aug. 18, 2011.
U.S. Appl. No. 13/673,160, filed with the USPTO on Nov. 9, 2012.
JP2000129114 A, May 9, 2000, Abstract Only, 1 page.
JP2000159900 A, Jun. 13, 2000, Abstract Only, 1 page.
JP2001079842 A, Mar. 27, 2001, Abstract Only, 1 page.
JP2002212414 A, Jul. 31, 2002, Abstract Only, 1 page.
JP2003103521 A, Apr. 9, 2003, Abstract Only, 1 page.
JP2003320532 A, Nov. 11, 2003, Abstract Only, 1 page.
JP2004002614 A, Jan. 8, 2004, Abstract Only, 1 page.
JP2004314420 A, Nov. 11, 2004, Abstract Only, 1 page.
JP2005112930 A, Apr. 28, 2005, Abstract Only, 1page.
JP2005154584 A, Jun. 16, 2005, Abstract Only, 1 page.
JP2005179476 A, Jul. 7, 2005, Abstract Only, 1 page.
JP2006137808 A, Jun. 1, 2006, Abstract Only, 1 page.
JP2006274032 A, Oct. 12, 2006, Abstract Only, 1 page.
JP2006297620 A, Nov. 2, 2006, Abstract Only, 1 page.
JP2009256691 A, Nov. 5, 2009, Abstract Only, 1 page.
JP2010083977 A, Apr. 15, 2010, Abstract Only, 1 page.
JP2010105244 A, May 13, 2010, Abstract Only, 1 page.
JP2011063689 A, Mar. 31, 2011, Abstract Only, 1 page.
JP2002088212 A, Mar. 27, 2002, Abstract, 1 page.
JP2002198116 A, Jul. 12, 2002, Abstract, 2 pages.
Liang et al., "The Effect of Residual Impurities on the Rheological and Mechanical Properties of Engineering Polymers Separated From Mixed Plastics", SPE 59th ANTEC May 6, 2010, 2001; 5 pages.
PCT/US2005/011788 International Search Report, mailed Jul. 1, 2005, 6 pages.

(Continued)

*Primary Examiner* — Hui Chin
(74) *Attorney, Agent, or Firm* — Cantor Colburn LLP

(57) ABSTRACT

A composition includes specific amounts of a virgin poly (arylene ether) resin and a rubber-modified polystyrene that is preferably derived from post-consumer recycling. The composition includes about 0.2 to about 1.5 weight percent of polymerized acrylonitrile residue that can originate as a contaminant in the recycled rubber-modified polystyrene. The composition avoids the need for compatibilizing agents required by related compositions.

29 Claims, 1 Drawing Sheet

(56) References Cited

OTHER PUBLICATIONS

Empera641F Product Information Sheet downloaded from http://www.ineosstyrenics.com/cfapps/prodfinder/documents/datasheets/EU_HIPS_Empera641F_datasheet_EN.pdf, Sep. 19, 2011, 2 pages.

Polystyrene Impact 3450 Technical Data Sheet downloaded from http://www.totalpetrochemicals.com/EN/ProductCatalog/Catalog/Pages/3450-EU.aspx, Sep. 19, 2011, 1 page.

PCT/US2005011788, Written Opinion, date of mailing Jul. 1, 2005, 6 pages.

U.S. Appl. No. 13/457,616, filed with the USPTO on Apr. 27, 2012.

International Search Report for International Application No. PCT/US2012/048914, International Application Filing Date Jul. 31, 2012, Date of Mailing Feb. 26, 2013, 4 pages.

Written Opinion for International Application No. PCT/US2012/048914, International Application Filing Date Jul. 31, 2012, Date of Mailing Feb. 26, 2013, 4 pages.

International Search Report for International Application No. PCT/US2013/035733, International Application Filing Date Apr. 9, 2013, Date of Mailing Jul. 15, 2013, 6 pages.

Written Opinion for International Application No. PCT/US2013/035733, International Application Filing Date Apr. 9, 2013, Date of Mailing Jul. 15, 2013, 6 pages.

\* cited by examiner

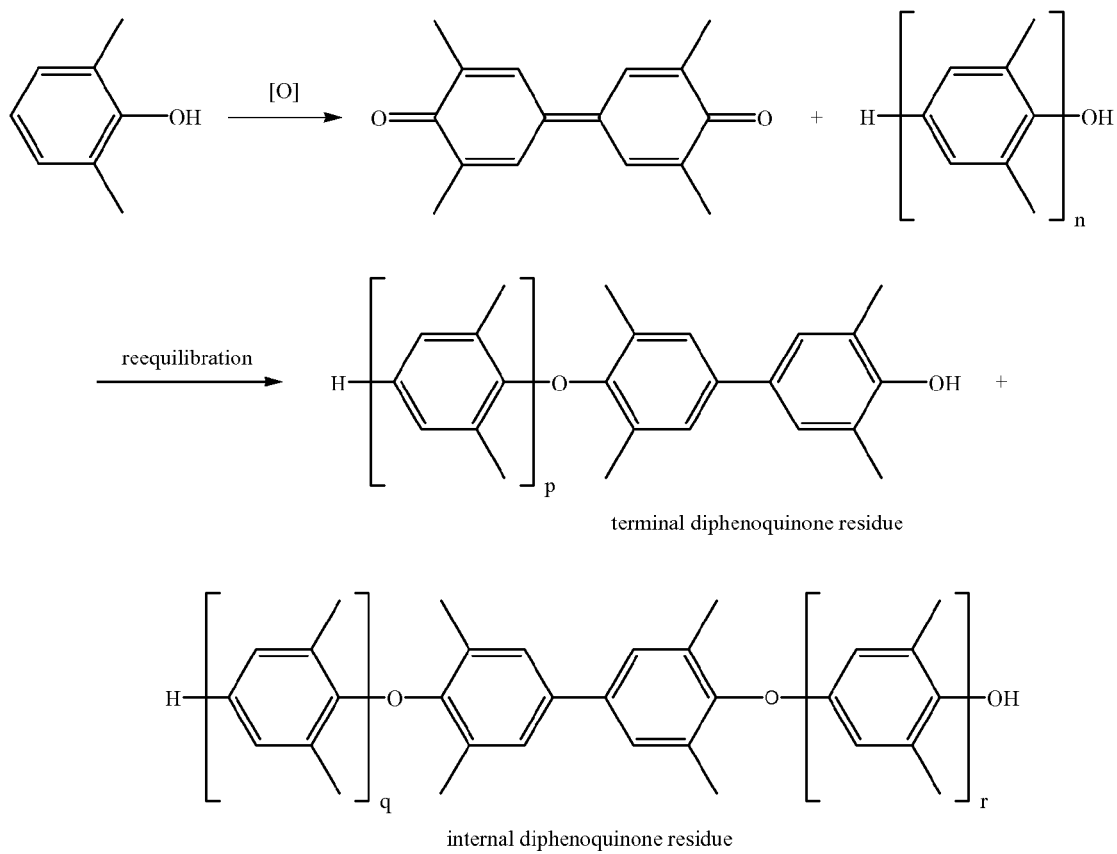

POLY(ARYLENE ETHER) COMPOSITION, METHOD, AND ARTICLE

CROSS REFERENCE TO RELATED APPLICATIONS

This application claims priority to U.S. Provisional Application Ser. No. 61/524,810, filed Aug. 18, 2011.

BACKGROUND OF THE INVENTION

Poly(arylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(arylene ether)s with various other plastics in order to meet the requirements of a wide variety of consumer products, for example, plumbing fixtures, electrical boxes, automotive parts, and insulation for wire and cable.

Blends of poly(arylene ether)s and rubber-modified polystyrenes are commercially available and used for injection molding impact-resistant articles such as housings for appliances and consumer electronics. To reduce waste and conserve energy, it would be useful to prepare blends of poly (arylene ether)s and rubber-modified polystyrenes using a recycled rubber-modified polystyrene. U.S. Pat. No. 5,264, 487 to Scobbo et al. describes a plastic composition that includes a poly(arylene ether) and a polystyrene, and further includes an acrylonitrile-butadiene-styrene copolymer and a copolymer of an olefin such as ethylene and an epoxy compound such as glycidyl methacrylate. The poly(arylene ether), polystyrene, and acrylonitrile-butadiene-styrene copolymer can be provided in the form of a mixed recycling stream. However, the poor compatibility of the acrylonitrile-butadiene-styrene copolymer with the poly(arylene ether) and polystyrene requires the use of the olefin-epoxy copolymer as a compatibilizer. It would be desirable to avoid the complexity and expense of using such a compatibilizer. U.S. Pat. No. 7,964,675 to Ko et al. describes a plastic composition that includes a recycled poly(arylene ether) and another recycled plastic that can be, among others, acrylonitrile-butadiene-styrene copolymer. The composition minimizes or eliminates any recycled plastic that can decompose and form volatile components during formation of the plastic composition. The Ko composition maximizes use of recycled feedstocks, however, its physical and flame retardancy properties are not sufficient for some injection molding applications. There therefore remains a need for blends of poly(arylene ether)s and rubber-modified polystyrenes that utilize a recycled plastic feedstock while largely preserving the physical and flame retardancy properties exhibited by blends prepared from virgin resins.

BRIEF DESCRIPTION OF THE INVENTION

One embodiment is a composition comprising: about 30 to about 60 weight percent of a poly(arylene ether) consisting of virgin poly(arylene ether); about 20 to about 55 weight percent of a rubber-modified polystyrene; and about 0.2 to about 1.5 weight percent of polymerized acrylonitrile residue; wherein the composition comprises less than 3 weight percent of a copolymer of an ethylenically unsaturated epoxy compound and an olefin; and wherein all weight percents are based on the total weight of the composition, unless a different basis is specified.

Another embodiment is a method of forming a composition, comprising: melt blending components comprising about 30 to about 60 weight percent of a poly(arylene ether) consisting of virgin poly(arylene ether), about 20 to about 55 weight percent of a rubber-modified polystyrene, and about 0.2 to about 1.5 weight percent of polymerized acrylonitrile residue to form the composition; wherein the composition comprises less than 3 weight percent of a copolymer of an ethylenically unsaturated epoxy compound and an olefin; and wherein all weight percents are based on the total weight of the composition, unless a different basis is specified.

Another embodiment is a composition formed by a method, comprising: melt blending components comprising about 30 to about 60 weight percent of a poly(arylene ether) consisting of virgin poly(arylene ether), about 20 to about 55 weight percent of a rubber-modified polystyrene, and about 0.2 to about 1.5 weight percent of polymerized acrylonitrile residue to form the composition; wherein the composition comprises less than 3 weight percent of a copolymer of an ethylenically unsaturated epoxy compound and an olefin; and wherein all weight percents are based on the total weight of the composition, unless a different basis is specified.

Another embodiment is an injection molded article comprising a composition comprising: about 30 to about 60 weight percent of a poly(arylene ether) consisting of virgin poly(arylene ether); about 20 to about 55 weight percent of a rubber-modified polystyrene; and about 0.2 to about 1.5 weight percent of polymerized acrylonitrile residue; wherein the composition comprises less than 3 weight percent of a copolymer of an ethylenically unsaturated epoxy compound and an olefin; and wherein all weight percents are based on the total weight of the composition, unless a different basis is specified.

These and other embodiments are described in detail below.

BRIEF DESCRIPTION OF THE FIGURES

FIG. 1 is a chemical scheme for the preparation of a poly (arylene ether) by oxidative polymerization of 2,6-dimethylphenol to yield poly(2,6-dimethyl-1,4-phenylene ether) and 3,3',5,5'-tetramethyldiphenoquinone; reequilibration of the reaction mixture can produce a poly(arylene ether) with terminal and internal residues of incorporated diphenoquinone.

DETAILED DESCRIPTION OF THE INVENTION

In an exploration of blends of poly(arylene ether) and rubber-modified polystyrene utilizing recycled rubber-modified polystyrene, the present inventors have determined that recycled rubber-modified polystyrene often includes significant amounts of styrene-acrylonitrile copolymer and acrylonitrile-butadiene-styrene copolymer impurities. At high levels, these impurities can significantly compromise the impact strength and flame retardancy of the polymer blend. By utilizing a virgin poly(arylene ether) resin and placing a specific limit on the amount of polymerized acrylonitrile residues associated with styrene-acrylonitrile copolymer and acrylonitrile-butadiene-styrene copolymer impurities, the present inventors have determined that it is possible to provide a blend of poly(arylene ether) and rubber-modified polystyrene that utilizes recycled rubber-modified polystyrene while largely preserving the desirable properties of a corresponding blend prepared from virgin resins.

Thus, one embodiment is a composition comprising: about 30 to about 60 weight percent of a poly(arylene ether) consisting of virgin poly(arylene ether); about 20 to about 55 weight percent of a rubber-modified polystyrene; and about 0.2 to about 1.5 weight percent of polymerized acrylonitrile residue; wherein the composition comprises less than 3 weight percent of a copolymer of an ethylenically unsaturated epoxy compound and an olefin; and wherein all weight percents are based on the total weight of the composition, unless a different basis is specified.

The composition comprises a poly(arylene ether). Suitable poly(arylene ether)s include those comprising repeating structural units having the formula

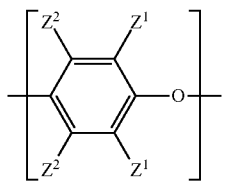

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) has an intrinsic viscosity of about 0.2 to about 1 deciliter per gram measured at 25° C. in chloroform. Within this range, the poly(arylene ether) intrinsic viscosity can be about 0.25 to about 0.65 deciliter per gram, more specifically about 0.25 to about 0.5 deciliter per gram, even more specifically about 0.25 to about 0.46 deciliter per gram, yet more specifically about 0.25 to about 0.35 deciliter per gram.

The poly(arylene ether) used to prepare the composition consists of a "virgin" poly(arylene ether), which means that it is an as-produced poly(arylene ether), as contrasted with a recycled poly(arylene ether) or a poly(arylene ether) that has undergone significant thermal processing. Compared to a recycled poly(arylene ether), a virgin poly(arylene ether) will generally possess lower concentrations of poly(arylene ether) rearrangement products, such as bridging products and branching products. For example, a virgin poly(2,6-dimethyl-1,4-phenylene ether) will generally possess less than 100 parts per million by weight of the bridging fragment below:

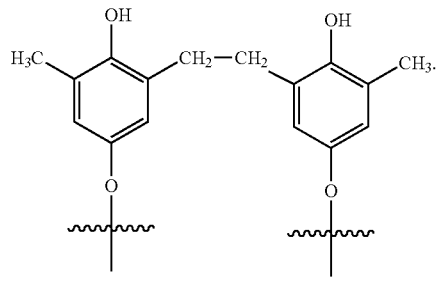 [SMILES: *Oc1cc(C)c(O)c(CCc2cc(O*)cc(C)c2O)c1]

As another example, a virgin poly(2,6-dimethyl-1,4-phenylene ether) will generally possess less than 100 parts per million by weight of the branching fragment below:

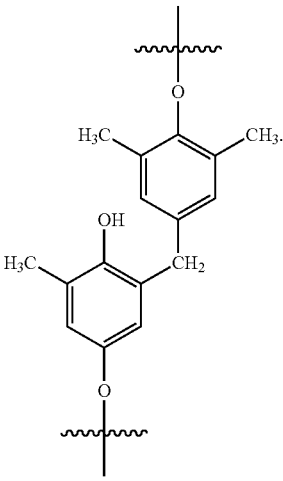 [SMILES: *Oc1cc(C)c(O)c(Cc2cc(C)c(O*)c(C)c2)c1]

These fragments can be identified and quantified by nuclear magnetic resonance spectroscopy.

In some embodiments, the poly(arylene ether) is a poly(2,6-dimethyl-1,4-phenylene ether) prepared with a morpholine-containing catalyst, wherein a purified sample of poly(2,6-dimethyl-1,4-phenylene ether) prepared by dissolution of the poly(2,6-dimethyl-1,4-phenylene ether) in toluene, precipitation from methanol, reslurry, and isolation has a monomodal molecular weight distribution in the molecular weight range of 250 to 1,000,000 atomic mass units, and comprises less than or equal to 2.2 weight percent of poly(2,6-dimethyl-1,4-phenylene ether) having a molecular weight more than fifteen times the number average molecular weight of the entire purified sample. In some embodiments, the purified sample after separation into six equal poly(2,6-dimethyl-1,4-phenylene ether) weight fractions of decreasing molecular weight comprises a first, highest molecular weight fraction comprising at least 10 mole percent of poly(2,6-dimethyl-1,4-phenylene ether) comprising a terminal morpholine-substituted phenoxy group. The poly(2,6-dimethyl-1,4-phenylene ether) according to these embodiments is further described in U.S. Patent Application Publication No. US 2011/0003962 A1 of Carrillo et al.

In some embodiments, the poly(arylene ether) is essentially free of incorporated diphenoquinone residues. In the context, "essentially free" means that the fewer than 1 weight percent of poly(arylene ether) molecules comprise the residue of a diphenoquinone. As described in U.S. Pat. No. 3,306,874 to Hay, synthesis of poly(arylene ether) by oxidative polymerization of monohydric phenol yields not only the desired poly(arylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(arylene ether) (i.e., the diphenoquinone is incorporated into the poly(arylene ether) structure) by heating the polymerization reaction mixture to yield a poly(arylene ether) comprising terminal or internal diphenoquinone residues. For example, as shown in FIG. 1, when a poly(arylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(arylene ether) with terminal and internal residues of incorporated diphenoquinone. However, such reequilibration reduces the molecular weight of the poly(arylene ether) (e.g., p and q+r are less than n). Accordingly, when a higher molecular weight poly(arylene ether) is desired, it may be desirable to separate the diphenoquinone from the poly(arylene ether) rather than reequilibrating the diphenoquinone into the poly(arylene ether) chains. Such a separation can be achieved, for example, by precipitation of the poly(arylene ether) in a solvent or solvent mixture in which the poly(arylene ether) is insoluble and the diphenoquinone is soluble. For example, when a poly(arylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(arylene ether) chain can be minimized (e.g., by isolating the poly(arylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly(arylene ether) can be adjusted to a temperature of about 25° C., at which diphenoquinone is poorly soluble but the poly(arylene ether) is soluble, and the insoluble diphenoquinone can be removed by solid-liquid separation (e.g., filtration).

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether). In some embodiments, the poly(arylene ether) comprises a poly(2,6-dimethyl-1,4-phenylene ether) having an intrinsic viscosity of about 0.25 to about 0.5 deciliter per gram, specifically about 0.25 to about 0.46 deciliter per gram, more specifically about 0.25 to about 0.35 deciliter per gram, measured at 25° C. in chloroform.

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The composition comprises the poly(arylene ether) in an amount of about 30 to about 60 weight percent, based on the total weight of the composition. Within this range, the poly(arylene ether) amount can be about 35 to about 50 weight percent, specifically about 40 to about 50 weight percent.

In addition to the poly(arylene ether), the composition comprises a rubber-modified polystyrene. The rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises about 80 to about 96 weight percent polystyrene, specifically about 88 to about 94 weight percent polystyrene; and about 4 to about 20 weight percent polybutadiene, specifically about 6 to about 12 weight percent polybutadiene, based on the weight of the rubber-modified polystyrene. In some embodiments, the rubber-modified polystyrene has an effective gel content of about 10 to about 35 percent.

As further described below, in some embodiments at least part of the rubber-modified polystyrene is provided as a post-consumer recycled material. Such post-consumer recycled materials are commercially available as, for example, PS01 3028 from Axion Polymers. When the rubber-modified polystyrene is provided as a post-consumer recycled material, the amount of rubber-modified polystyrene in the composition will account for the purity of the recycled material. For example, if a composition incorporates 40 weight percent of a post-consumer recycled rubber-modified polystyrene that is 90% pure, then the composition contains 36% rubber-modified polystyrene.

In some embodiments, a virgin rubber-modified polystyrene is used alone or in combination with a recycled rubber-modified polystyrene. Suitable virgin rubber-modified polystyrenes are commercially available as, for example, HIPS3190 from SABIC Innovative Plastics.

The composition comprises the rubber-modified polystyrene in an amount of about 20 to about 55 weight percent, specifically about 30 to about 50 weight percent, more specifically about 35 to about 50 weight percent, even more specifically about 40 to about 50 weight percent, based on the total weight of the composition.

In addition to the poly(arylene ether) and the rubber-modified polystyrene, the composition comprises polymerized acrylonitrile residue. As used herein, the term "polymerized acrylonitrile residue" refers to the residue of polymerized acrylonitrile in the form of acrylonitrile homopolymers and copolymers. In other words, polymerized acrylonitrile residue refers to the sum of all polymer repeat units having the structure

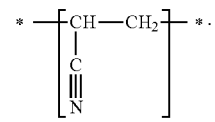

In some embodiments, the rubber-modified polystyrene and the polymerized acrylonitrile residue are provided in the form of a post-consumer recycled rubber-modified polystyrene that comprises as impurities styrene-acrylonitrile copolymer, acrylonitrile-butadiene-styrene copolymer, or a mixture thereof. In these embodiments, the polymerized acrylonitrile residue is in the form of an acrylonitrile copolymer selected from the group consisting of styrene-acrylonitrile copolymer, acrylonitrile-butadiene-styrene copolymer, and mixtures thereof. When present, styrene-acrylonitrile copolymer can be derived not only from an impurity within the post-consumer recycled rubber-modified polystyrene but also from the intentionally added drip retardant that is polytetrafluoroethylene encapsulated with styrene-acrylonitrile copolymer.

The weight percent of polymerized acrylonitrile residue in a composition can be determined either by $^{13}C$ nuclear magnetic resonance spectroscopy ($^{13}C$ NMR) or by infrared spectroscopy. An illustrative procedure for determining weight percent of polymerized acrylonitrile by $^{13}C$ NMR follows. Four hundred (400) milligrams of a polymer blend composition are dissolved in 4 milliliters deuterated chloroform containing 15 milligrams per milliliter chromium tris(acetylacetonate) as a spin-lattice relaxation agent. $^{13}C$ NMR spectra are acquired on a Varian Mercury Plus 400 instrument operating at an observed frequency of 100.6 megahertz. The instrument is equipped with a 10 millimeter broadband probe. Spectra for all samples are collected under quantitative conditions. Gated decoupling using the WALTZ-16 pulse sequence was employed. The decoupler was gated off during the pulse delay to eliminate nuclear Overhauser effect (NOE) and to ensure complete relaxation of carbon nuclei between scans. Acquisition parameters included a pulse delay of 5 seconds and a 45° flip angle. Also, a 30.2 kilohertz spectral width and 30,000 (30K) data points resulted in a 1.00 second acquisition time. Data processing was carried out using Net-NMRO software with 2 hertz line broadening and a polynomial baseline correction routine. Relative to a carbon chemical shift of 77.0 ppm for deuterated chloroform, the chemical shift for the nitrile carbon of polyacrylonitrile is in the range 117.40 to 122.15 ppm. By repeating the experiment with varying amounts of added pure polyacrylonitrile, the polyacrylonitrile content of the polymer blend can be determined.

The composition comprises the polymerized acrylonitrile residue in an amount of about 0.2 to about 1.5 weight percent, based on the total weight of the composition. Within this range, the polymerized acrylonitrile residue amount can be about 0.25 to about 1 weight percent, specifically about 0.3 to about 0.8 weight percent. Polymerized acrylonitrile residue amounts less than about 0.2 weight percent are difficult to obtain when using recycled rubber-modified polystyrene, because styrene-acrylonitrile copolymer, acrylonitrile-butadiene-styrene copolymer, and their mixtures are used in many of the same consumer products as rubber-modified polystyrene. And polymerized acrylonitrile residue amounts greater than 1.5 weight percent are generally associated with styrene-acrylonitrile copolymer and/or acrylonitrile-butadiene-styrene copolymer amounts that are detrimental to the physical properties and/or flame retardancy of the blend, as demonstrated in the working examples below.

The composition can reduce or eliminate the compatibilizer required in an amount of at least 5 weight percent in the compositions of U.S. Pat. No. 5,264,487 to Scobbo et al. Thus, the present composition comprises less or equal to 3 weight percent, based on the total weight of the composition, of a copolymer of an ethylenically unsaturated epoxy compound and an olefin. In some embodiments, the amount of this copolymer is less than or equal to 2 weight percent, specifically less than or equal to 1 weight percent. In some embodiments, the composition excludes the copolymer of an ethylenically unsaturated epoxy compound and an olefin.

The composition can, optionally, further comprise a flame retardant. A flame retardant is a chemical compound or mixture of chemical compounds capable of improving the flame retardancy of the composition. Suitable flame retardants include organophosphate esters, metal dialkylphosphinates, nitrogen-containing flame retardants, metal hydroxides, and mixtures thereof.

In some embodiments, the flame retardant comprises an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris (isopropylphenyl) phosphates (for example, CAS Reg. No. 68937-41-7), and mixtures thereof.

In some embodiments the organophosphate ester comprises a bis-aryl phosphate having the formula

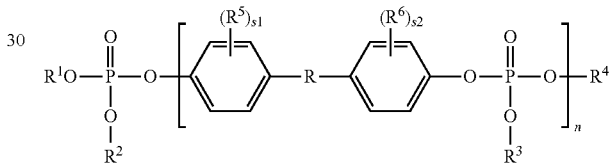

wherein R is independently at each occurrence a $C_1$-$C_{12}$ alkylene group; $R^5$ and $R^6$ are independently at each occurrence a $C_1$-$C_5$ alkyl group; $R^1$, $R^2$, and $R^4$ are independently a $C_1$-$C_{12}$ hydrocarbyl group; $R^3$ is independently at each occurrence a $C_1$-$C_{12}$ hydrocarbyl group; n is 1 to 25; and s1 and s2 are independently an integer equal to 0, 1, or 2. In some embodiments $OR^1$, $OR^2$, $OR^3$ and OW are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

In some embodiments, the flame retardant comprises a metal dialkylphosphinate As used herein, the term "metal dialkylphosphinate" refers to a salt comprising at least one metal cation and at least one dialkylphosphinate anion. In some embodiments, the metal dialkylphosphinate has the formula

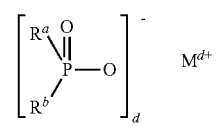

wherein $R^a$ and $R^b$ are each independently $C_1$-$C_6$ alkyl; M is calcium, magnesium, aluminum, or zinc; and d is 2 or 3.

Examples of $R^a$ and $R^b$ include methyl, ethyl, n-propyl, isopropyl, n-butyl, tert-butyl, n-pentyl, and phenyl. In some embodiments, $R^a$ and $R^b$ are ethyl, M is aluminum, and d is 3 (that is, the metal dialkylphosphinate is aluminum tris(diethylphosphinate)).

In some embodiments, the metal dialkylphosphinate is in particulate form. The metal dialkylphosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkylphosphinate may be combined with a polymer, such as a poly(arylene ether), a polyolefin, a polyamide, a block copolymer, or combination thereof, to form a masterbatch. The metal dialkylphosphinate masterbatch comprises the metal dialkylphosphinate in an amount greater than is present in the thermoplastic composition. Employing a masterbatch for the addition of the metal dialkylphosphinate to the other components of the composition can facilitate addition and improve distribution of the metal dialkylphosphinate.

In some embodiments, the flame retardant comprises a nitrogen-containing flame retardant comprising a nitrogen-containing heterocyclic base and a phosphate or pyrophosphate or polyphosphate acid. In some embodiments, the nitrogen-containing flame retardant has the formula

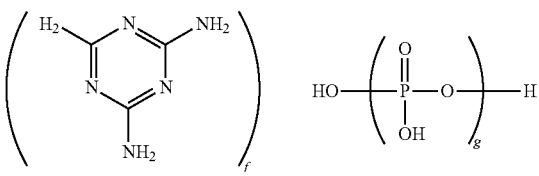

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to 10,000, specifically 5 to 1,000, more specifically 10 to 500. In some embodiments in which the nitrogen-containing flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in International Patent Application No. WO 98/08898 A1 to Jacobson et al. In some embodiments, the nitrogen-containing flame retardant comprises melamine cyanurate.

The nitrogen-containing flame retardant can have a low volatility. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame retardant comprises a metal hydroxide. Suitable metal hydroxides include all those capable of providing fire retardancy, as well as combinations of such metal hydroxides. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include, but are not limited to, magnesium hydroxide (for example, CAS Reg. No. 1309-42-8), aluminum hydroxide (for example, CAS Reg. No. 21645-51-2), cobalt hydroxide (for example, CAS Reg. No. 21041-93-0) and combinations of two or more of the foregoing. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be coated, for example, with stearic acid or other fatty acid.

When present in the composition, the flame retardant is used in an amount of about 1 to about 25 weight percent of the flame retardant, based on the total weight of the composition. Within this range, the flame retardant amount can be about 2 to about 20 weight percent, specifically about 4 to about 18 weight percent. When the flame retardant comprises an organophosphate ester, it is typically used in an amount of about 5 to about 25 weight percent, specifically about 10 to about 20 weight percent, more specifically about 12 to about 16 weight percent, based on the total weight of the composition. In some embodiments the flame retardant consists of the organophosphate ester.

The composition can, optionally, further include glass fibers. Suitable glass fibers include those based on E, A, C, ECR, R, S, D, and NE glasses, as well as quartz. The glass fiber can have a diameter of about 2 to about 30 micrometers, specifically about 5 to about 25 micrometers, more specifically about 5 to about 15 micrometers. The length of the glass fibers before compounding can be about 2 to about 7 millimeters, specifically about 1.5 to about 5 millimeters. Alternatively, longer glass fibers or continuous glass fibers can be used. The glass fiber can, optionally, include an adhesion promoter to improve its compatibility with the polyamide, the poly(arylene ether), or both. Adhesion promoters include chromium complexes, silanes, titanates, zirco-aluminates, propylene maleic anhydride copolymers, reactive cellulose esters and the like. Suitable glass fiber is commercially available from suppliers including, for example, Owens Corning, Nippon Electric Glass, PPG, and Johns Manville. When present, the glass fibers are used in an amount of about 1 to about 50 weight percent, based on the total weight of the composition. Within this range, the glass fiber amount can be about 5 to about 50 weight percent, specifically about 10 to about 40 weight percent, more specifically about 15 to about 30 weight percent.

In some embodiments, the composition excludes glass fibers.

The composition can, optionally, minimize or exclude polymers other than those described herein as required or optional. For example, in some embodiments the composition excludes homopolystyrenes. In some embodiments, the composition excludes polyamides. In some embodiments, the composition excludes polyesters. In some embodiments, the composition excludes unhydrogenated and hydrogenated block copolymers of an alkenyl aromatic compound and a conjugated diene. In some embodiments, the composition comprises less than or equal to 2 weight percent polyolefin. Use of less than 2 weight percent of polyolefin as a mold release agent may be desirable. In some embodiments, the composition excludes poly(alkylene glycol)s, such as the low molecular weight poly(alkylene glycol)s termed "polyolefin glycols" in U.S. Pat. No. 4,433,088 to Haaf et al. about 40 to about 50 weight percent of a poly(arylene ether) consisting of virgin poly(arylene ether); about 32 to about 40 weight percent of a rubber-modified polystyrene; about 10 to about 20 weight percent of an organophosphate ester; and about 0.25 to about 1 weight percent of polymerized acrylonitrile residue in the form of an acrylonitrile copolymer selected from the group consisting of styrene-acrylonitrile copolymer, acrylonitrile-butadiene-styrene copolymer, and mixtures thereof; wherein the rubber-modified polystyrene and the polymerized acrylonitrile residue are provided in the form of a post-consumer recycled rubber-modified polystyrene; wherein the composition comprises less than 3 weight percent of a copolymer of an ethylenically unsaturated epoxy compound and an olefin; wherein the composition excludes polyamides; and wherein all weight percents are based on the total weight of the composition, unless a different basis is specified. In some embodiments, the foregoing composition consists of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

The invention extends to methods of preparing the composition. Thus, one embodiment is a method of forming a composition, comprising: melt blending components comprising about 30 to about 60 weight percent of a poly(arylene ether) consisting of virgin poly(arylene ether), about 20 to about 55 weight percent of a rubber-modified polystyrene, and about 0.2 to about 2 weight percent of polymerized acrylonitrile residue to form the composition; wherein the composition comprises less than 3 weight percent of a copolymer of an ethylenically unsaturated epoxy compound and an olefin; and wherein all weight percents are based on the total weight of the composition, unless a different basis is specified. The melt blending can be performed using known equipment such as ribbon blenders, Henschel mixers, Banbury mixers, drum tumblers, single-screw extruders, twin-screw extruders, multi-screw extruders, co-kneaders, and the like. For example, the present composition can be prepared by melt-blending the components in a twin-screw extruder at a temperature of about 250 to about 350° C., specifically about 260 to about 290° C. All of the above-described variations in the composition apply as well to the method of preparing the composition.

The invention further extends compositions prepared by the method or obtainable by the method. Again, all of the above-described variations in the composition apply as well to the method of preparing the composition.

The invention includes injection molded articles comprising the composition. The composition is particularly suitable for injection molding housings for consumer electronics (for example, the backs of flat-screen televisions), appliance components (for example, refrigerator linings and washing machine lids), and electrical enclosures. In some embodiments, the injection molding conditions include a barrel temperature of about 250 to about 350° C., specifically about 275 to about 310° C., and a mold temperature of about 70 to about 100° C., specifically about 85 to about 95° C.

The invention includes at least the following embodiments.

Embodiment 1

A composition comprising: about 30 to about 60 weight percent of a poly(arylene ether) consisting of virgin poly(arylene ether); about 20 to about 55 weight percent of a rubber-modified polystyrene; and about 0.2 to about 1.5 weight percent of polymerized acrylonitrile residue; wherein the composition comprises less than 3 weight percent of a copolymer of an ethylenically unsaturated epoxy compound and an olefin; and wherein all weight percents are based on the total weight of the composition, unless a different basis is specified.

Embodiment 2

The composition of embodiment 1, wherein the rubber-modified polystyrene and the polymerized acrylonitrile residue are provided in the form of a post-consumer recycled rubber-modified polystyrene comprising styrene-acrylonitrile copolymer, acrylonitrile-butadiene-styrene copolymer, or a mixture thereof.

Embodiment 3

The composition of embodiment 1 or 2, further comprising about 1 to about 25 weight percent of a flame retardant.

Embodiment 4

The composition of embodiment 3, wherein the flame retardant comprises an organophosphate ester.

Embodiment 5

The composition of any of embodiments 1-4, excluding polyamides.

Embodiment 6

A composition comprising: about 40 to about 50 weight percent of a poly(arylene ether) consisting of virgin poly(arylene ether); about 32 to about 40 weight percent of a rubber-modified polystyrene; about 10 to about 20 weight percent of an organophosphate ester; and about 0.25 to about 1 weight percent of polymerized acrylonitrile residue in the form of an acrylonitrile copolymer selected from the group consisting of styrene-acrylonitrile copolymer, acrylonitrile-butadiene-styrene copolymer, and mixtures thereof; wherein the rubber-modified polystyrene and the polymerized acrylonitrile residue are provided in the form of a post-consumer recycled rubber-modified polystyrene; wherein the composition comprises less than 3 weight percent of a copolymer of an ethylenically unsaturated epoxy compound and an olefin; wherein the composition excludes polyamides; and wherein all weight percents are based on the total weight of the composition, unless a different basis is specified.

Embodiment 6a

The composition of embodiment 1, wherein the composition comprises about 40 to about 50 weight percent of the poly(arylene ether), about 32 to about 40 weight percent of the rubber-modified polystyrene, and about 0.25 to about 1 weight percent of the polymerized acrylonitrile residue; wherein the composition further comprises about 10 to about 20 weight percent of an organophosphate ester; wherein the rubber-modified polystyrene and the polymerized acrylonitrile residue are provided in the form of a post-consumer recycled rubber-modified polystyrene; and wherein the composition excludes polyamides.

Embodiment 7

The composition of embodiment 6 or 6a, consisting of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

Embodiment 8

A method of forming a composition, comprising: melt blending components comprising about 30 to about 60 weight percent of a poly(arylene ether) consisting of virgin poly(arylene ether), about 20 to about 55 weight percent of a rubber-modified polystyrene, and about 0.2 to about 1.5 weight percent of polymerized acrylonitrile residue to form the composition; wherein the composition comprises less than 3 weight percent of a copolymer of an ethylenically unsaturated epoxy compound and an olefin; and wherein all weight percents are based on the total weight of the composition, unless a different basis is specified.

Embodiment 9

The method of embodiment 8, wherein the rubber-modified polystyrene and the polymerized acrylonitrile residue are provided in the form of a post-consumer recycled rubber-modified polystyrene comprising styrene-acrylonitrile copolymer, acrylonitrile-butadiene-styrene copolymer, or a mixture thereof.

Embodiment 10

The method of embodiment 8 or 9, wherein the composition further comprises about 1 to about 25 weight percent of a flame retardant.

Embodiment 11

The method of embodiment 10, wherein the flame retardant comprises an organophosphate ester.

Embodiment 12

The method of any of embodiments 8-10, wherein the composition excludes polyamides.

Embodiment 13

The method of embodiment 8, wherein the composition comprises about 40 to about 50 weight percent of the poly(arylene ether), about 32 to about 40 weight percent of the rubber-modified polystyrene, and about 0.25 to about 1 weight percent of the polymerized acrylonitrile residue; wherein the composition further comprises about 10 to about 20 weight percent of an organophosphate ester; wherein the rubber-modified polystyrene and the polymerized acrylonitrile residue are provided in the form of a post-consumer recycled rubber-modified polystyrene; and wherein the composition excludes polyamides.

Embodiment 14

The method of embodiment 13, wherein the composition consists of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

Embodiment 15

A composition formed by the method of embodiment 8.

Embodiment 16

The composition of embodiment 15, wherein the rubber-modified polystyrene and the polymerized acrylonitrile residue are provided in the form of a post-consumer recycled rubber-modified polystyrene comprising styrene-acrylonitrile copolymer, acrylonitrile-butadiene-styrene copolymer, or a mixture thereof.

Embodiment 17

The composition of embodiment 15 or 16, further comprising about 1 to about 25 weight percent of a flame retardant.

Embodiment 18

The composition of embodiment 17, wherein the flame retardant comprises an organophosphate ester.

Embodiment 19

The composition of any of embodiments 15-18, excluding polyamides.

Embodiment 20

The composition of embodiment 15, wherein the composition comprises about 40 to about 50 weight percent of the poly(arylene ether), about 32 to about 40 weight percent of the rubber-modified polystyrene, and about 0.25 to about 1 weight percent of the polymerized acrylonitrile residue; wherein the composition further comprises about 10 to about 20 weight percent of an organophosphate ester; wherein the rubber-modified polystyrene and the polymerized acrylonitrile residue are provided in the form of a post-consumer recycled rubber-modified polystyrene; and wherein the composition excludes polyamides.

Embodiment 21

The composition of embodiment 20, consisting of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

Embodiment 22

An injection molded article comprising the composition of embodiment 1.

Embodiment 23

The injection molded article of embodiment 22, wherein the rubber-modified polystyrene and the polymerized acrylonitrile residue are provided in the form of a post-consumer recycled rubber-modified polystyrene comprising styrene-acrylonitrile copolymer, acrylonitrile-butadiene-styrene copolymer, or a mixture thereof.

Embodiment 24

The injection molded article of embodiment 22 or 23, further comprising about 1 to about 25 weight percent of a flame retardant.

Embodiment 25

The injection molded article of embodiment 24, wherein the flame retardant comprises an organophosphate ester.

Embodiment 26

The injection molded article of any of embodiments 22-25, excluding polyamides.

Embodiment 27

The injection molded article of embodiment 22, wherein the composition comprises about 40 to about 50 weight percent of the poly(arylene ether), about 32 to about 40 weight percent of the rubber-modified polystyrene, and about 0.25 to about 1 weight percent of polymerized acrylonitrile residue; wherein the composition further comprises about 10 to about 20 weight percent of an organophosphate ester; wherein the rubber-modified polystyrene and the polymerized acrylonitrile residue are provided in the form of a post-consumer recycled rubber-modified polystyrene; and wherein the composition excludes polyamides.

Embodiment 28

The injection molded article of embodiment 27, wherein the composition consists of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

The invention is further illustrated by the following non-limiting examples.

WORKING EXAMPLES

Compositions were prepared using the components summarized in Table 1.

TABLE 1

| Component | Description |
|---|---|
| PPE 0.46 | Poly(2,6-dimethyl-1,4-phenylene ether), CAS Reg. No. 24938-67-8, having an intrinsic viscosity of about 0.46 deciliter per gram as measured in chloroform at 25° C.; obtained as a virgin material as PPO 646 from SABIC Innovative Plastics. |
| PPE 0.3 | Poly(2,6-dimethyl-1,4-phenylene ether), CAS Reg. No. 24938-67-8, having an intrinsic viscosity of about 0.3 deciliter per gram as measured in chloroform at 25° C.; obtained as a virgin material as PPO 808 from SABIC Innovative Plastics. |
| HIPS | High-impact polystyrene (rubber-modified polystyrene), CAS Reg. No. 9003-55-8, having a volume average particle diameter of 2.4 micrometers, a rubber content of 10 weight percent, a mineral oil content of 1.5 weight percent, and a swell index of 17; obtained as a virgin material as HIPS3190 from SABIC Innovative Plastics. |
| HF HIPS | High-flow high-impact polystyrene (rubber-modified polystyrene) having a polystyrene content of about 90 weight percent and a polybutadiene content of about 10 weight percent; obtained as a virgin material as D7055.5 from American Styrenics. |
| PCR HIPS | High-impact polystyrene derived from post-consumer recycling, including about 96-97 weight percent rubber-modified polystyrene, about 1.5-2.5 weight percent acrylonitrile-butadiene-styrene copolymer, about 0.7-1.5 weight percent styrene-acrylonitrile copolymer, and about 0.2-0.5 weight percent polypropylene; obtained as PS01 3028 from Axion Polymers. |
| ABS | Acrylonitrile-butadiene-styrene copolymer, CAS Reg. No. 9003-56-9, having an acrylonitrile content of about 25 weight percent, a butadiene content of about 30, and a styrene content of about 45; obtained as a virgin material as GRM2600L from SABIC Innovative Plastics. |
| SAN | Styrene-acrylonitrile copolymer, CAS Reg. No. 9003-54-7, having an acrylonitrile content of about 30 weight percent, and a styrene content of about 70 weight percent; obtained as a virgin material as SAN 576 from SABIC Innovative Plastics. |
| TSAN | Poly(styrene-acrylonitrile)-encapsulated polytetrafluoroethylene, containing 50 weight percent polytetrafluoroethylene; obtained as a virgin material as F449 Encapsulated PTFE from SABIC Innovative Plastics. |
| MgO | Magnesium oxide, CAS Reg. No. 1309-48-4; obtained as KYOWAMAG 150 from Kyowa Chemical Co. Ltd. or REMAG AC from Spaeter C. GmBH. |
| ZnS | Zinc sulfide, CAS Reg. No. 1314-98-3; obtained as SACHTOLITH HD-S from Sachtleben Chemie GmbH. |

TABLE 1-continued

| Component | Description |
|---|---|
| LLDPE | Linear low density polyethylene, CAS Reg. No. 25087-34-7, having a density of 0.925 grams per cubic centimeter and a melt volume-flow rate of about 20 cubic centimeters per 10 minutes at 190° C. and 2.16 kilogram load; obtained as ESCORENE LL5100.09 from ExxonMobil. |
| Phosphite | Tris(2,4-di-tert-butylphenyl) phosphite, CAS Reg. No. 31570-04-4; obtained as IRGAFOS 168 from Ciba. |
| BPADP | Bisphenol A bis(diphenyl phosphate), CAS Reg. No. 181028-79-5; obtained as CR-741 from Daihachi Chemical, as FYROLFLEX BDP from ICL-IP, or as REOFOS BAPP from Chemtura Manufacturing UK Ltd. |
| Pigment black 7 | Pigment black 7, CAS Reg. No. 97793-37-8; obtained as MONARCH 800 from Cabot B.V. |

Preparative Examples 1-19

To simulate recycled rubber-modified polystyrenes, a series of rubber-modified polystyrene blends was prepared with varying amounts of acrylonitrile-butadiene-styrene copolymer (ABS) and/or styrene-acrylonitrile copolymer (SAN). The compositions are summarized in Table 2, where component amounts are in weight percent based on the total weight of the rubber-modified polystyrene blend. In Table 2, the numbered compositions are labeled using the designation "P. Ex." for Preparative Example.

Compositions were compounded on a Werner & Plfeiderer T30 twin-screw extruder having a 30 millimeter internal diameter. The extruder was operated at 300 rotations per minute and a throughput of 22.5 kilograms/hour. The extruder utilized six zones having temperatures of 180° C./200° C./200° C./200° C./200° C./210° C. from feed throat to die. The extrudate was cooled in a water bath, pelletized, and dried for 4 hours at 90° C. prior to use for molding.

TABLE 2

| | P. Ex. 1 | P. Ex. 2 | P. Ex. 3 | P. Ex. 4 | P. Ex. 5 |
|---|---|---|---|---|---|
| COMPOSITIONS | | | | | |
| HIPS | 100 | 97.5 | 95 | 90 | 80 |
| ABS | 0 | 0 | 0 | 0 | 0 |
| SAN | 0 | 2.5 | 5 | 10 | 20 |
| total | 100 | 100 | 100 | 100 | 100 |
| ABS + SAN | 0 | 2.5 | 5 | 10 | 20 |
| ABS:SAN | 0:0 | 0:1 | 0:1 | 0:1 | 0:1 |

| | P. Ex. 6 | P. Ex. 7 | P. Ex. 8 | P. Ex. 9 | P. Ex. 10 |
|---|---|---|---|---|---|
| COMPOSITIONS | | | | | |
| HIPS | 70 | 95 | 90 | 97.5 | 95 |
| ABS | 0 | 0 | 0 | 2.5 | 5 |
| SAN | 30 | 5 | 10 | 0 | 0 |
| total | 100 | 100 | 100 | 100 | 100 |
| ABS + SAN | 30 | 5 | 10 | 2.5 | 5 |
| ABS:SAN | 0:1 | 0:1 | 0:1 | 1:0 | 1:0 |

| | P. Ex. 11 | P. Ex. 12 | P. Ex. 13 | P. Ex. 14 | P. Ex. 15 |
|---|---|---|---|---|---|
| COMPOSITIONS | | | | | |
| HIPS | 90 | 80 | 70 | 95 | 90 |
| ABS | 10 | 20 | 30 | 5 | 10 |
| SAN | 0 | 0 | 0 | 0 | 0 |
| total | 100 | 100 | 100 | 100 | 100 |
| ABS + SAN | 10 | 20 | 30 | 5 | 10 |
| ABS:SAN | 1:0 | 1:0 | 1:0 | 1:0 | 1:0 |

TABLE 2-continued

| | P. Ex. 16 | P. Ex. 17 | P. Ex. 18 | P. Ex. 19 |
|---|---|---|---|---|
| COMPOSITIONS | | | | |
| HIPS | 95 | 90 | 80 | 70 |
| ABS | 2.5 | 5 | 10 | 15 |
| SAN | 2.5 | 5 | 10 | 15 |
| total | 100 | 100 | 100 | 100 |
| ABS + SAN | 5 | 10 | 20 | 30 |
| ABS:SAN | 1:1 | 1:1 | 1:1 | 1:1 |

Preparative Examples 20-24

These examples demonstration the effects of styrene-acrylonitrile copolymer and titanium dioxide on Notched Izod impact strength of rubber-modified polystyrene-based blends.

Compositions were compounded on a Werner & Plfeiderer twin screw extruder having a 25 millimeter internal diameter. The extruder was operated at 300 rotations per minute and a throughput of 10 to 15 kilograms/hour. The extruder utilized six zones having temperatures of 180° C./200° C./200° C./200° C./200° C./210° C. from feed throat to die. The compositions are summarized in Table 3, where component amounts are expressed in weight percent based on the total weight of the composition.

Test samples for physical property testing were injection molded on a L™ DIMAG 60T injection molding machine utilizing a barrel temperature of 205° C. and a mold temperature of 55° C.

For this experiment only, Notched Izod impact strength (expressed in units of kilojoules/meter$^2$) was measured at 23° C. according to ISO 179-1/1eA (2005), using an edge-wise impact geometry, no sample conditioning (bar notched immediately before testing), a hammer energy of 2 joules, bar dimensions of 80 millimeters by 10 millimeters by 4 millimeters, a notch angle of 45 degrees, a notch radius of 0.25 millimeters (Type A), an 8 millimeter depth of material under the notch, and a specimen support span of 62 millimeters; reported values reflect an average of 5 specimens per composition.

Comparison of Preparative Example 20 to Preparative Example 21 shows that the impact strength of post-consumer recycled rubber-modified polystyrene is much less than that of virgin rubber-modified polystyrene. Comparison of Preparative Example 20 to Preparative Examples 22 and 23 shows that addition of 5 or 10 weight percent styrene-acrylonitrile copolymer to rubber-modified polystyrene substantially reduces impact strength. Comparison of Preparative Example 20 to Preparative Example 24 shows that addition of 5 weight percent of the white pigment titanium dioxide to rubber-modified polystyrene substantially reduces impact strength.

TABLE 3

|  | P. Ex. 20 | P. Ex. 21 | P. Ex. 22 | P. Ex. 23 | P. Ex. 24 |
|---|---|---|---|---|---|
| COMPOSITIONS | | | | | |
| HIPS | 100 | 0 | 95 | 90 | 95 |
| PCR HIPS | 0 | 100 | 0 | 0 | 0 |
| SAN | 0 | 0 | 5 | 10 | 0 |
| TiO$_2$ | 0 | 0 | 0 | 0 | 5 |
| PROPERTIES | | | | | |
| Notched Izod (kJ/m$^2$) | 16 | 6 | 10 | 9 | 11 |

Preparative Example 25

A masterbatch ("PPE masterbatch") of poly(arylene ether) and additives was prepared using the composition summarized in Table 4, where component amounts are in weight percent based on the total weight of the PPE masterbatch. The components were dry blended to form the masterbatch.

TABLE 4

|  | PPE Masterbatch |
|---|---|
| PPE | 96.29 |
| MgO | 0.21 |
| ZnS | 0.21 |
| LLDPE | 2.55 |
| Phosphite | 0.17 |
| TSAN | 0.63 |
| total | 100.06 |

Examples 1-14

Comparative Examples 1-5

A series of poly(arylene ether) compositions were prepared to explore the effects of ABS and SAN impurities on blends of poly(arylene ether) and rubber-modified polystyrene. Compositions are summarized in Table 5, where component amounts are expressed in weight percent based on the total weight of the composition.

Compositions were compounded on a Werner & Pfeiderer T30 twin-screw extruder having a 30 millimeter internal diameter. The extruder was operated at 300 rotations per minute and a throughput of 20 kilograms/hour. The extruder utilized six zones having temperatures of 240° C./260° C./290° C./290° C./290° C./290° C. from feed throat to die. The extrudate was cooled in a water bath, pelletized, and dried for 1.5 hours at 105° C. prior to use for injection molding.

Test samples for physical property testing were injection molded on a Van Dorn 120-RS-6F injection molding machine utilizing a barrel temperature of 300° C. and a mold temperature of 90° C.

Physical properties of the Preparative Examples are summarized in Table 2 and were evaluated as follows. Tensile stress at yield and tensile stress at break (each expressed in units of megapascals), tensile elongation at yield and tensile elongation at break (each expressed in units of percent), and modulus of elasticity (expressed in units of megapascals) were determined according to ASTM D638-08 at 23° C. using a Type I bar with a thickness of 3.2 millimeters, a gage length of 50 millimeters, a grip separation of 115 millimeters, and a test speed of 50 millimeters/minute; reported values reflect an average of 5 specimens per composition. Flexural modulus (expressed in units of megapascals) was determined according to ASTM D790-07e1 at 23° C. using Procedure A, a bar having cross-sectional dimensions of 6.4 millimeters by 12.7 millimeters, a support span of 50.8 millimeters, a test speed of 0.05 inches/minute (0.127 millimeters/minute), loading nose and support radii of 5 millimeters; reported values reflect an average of 3 samples per composition. Notched Izod impact strength (expressed in units of joules/meter) total energy (expressed in joules) were determined according to ASTM D256-08, Method A at 23° C. using samples that were notched not less than 40 hours before testing, a hammer energy of 2 foot-pounds (2.712 joules), sample cross-sectional dimensions of 3.2 millimeters by 12.7 millimeters, a notch angle of 45 degrees, a notch radius of 0.25 millimeters, and a 10.16 millimeter depth of material under the notch; reported values reflect an average of 3 samples per composition. Heat deflection temperature (HDT) values (expressed in units of degrees centigrade) were measured according to ASTM D648-07, Method B, using a bar having cross-sectional dimensions of 3.2 by 12.5 millimeters, an edge-wise test direction, a 100 millimeter support span, a load of 264 pounds per square inch (1.82 megapascals), a heating rate of 2° C./minute, and a deflection at reading of 0.25 millimeters; reported values reflect an average of 3 specimens per composition.

The results indicate that compositions comprising less than or equal to 1.5 weight percent of acrylonitrile residues are generally superior in impact strength to those with more than 1.5 weight percent acrylonitrile residues. For instance, Comparative Example 2 with 1.68 weight percent acrylonitrile residues derived from styrene-acrylonitrile copolymer has a notched Izod impact strength of 58 joules/meter, compared to values of 72-93 joules per meter for Examples 1-6 containing 0.28-1.4 weight percent acrylonitrile residues derived from styrene-acrylonitrile copolymer. Also, Comparative Example 4 with 1.68 weight percent acrylonitrile residues derived from acrylonitrile-butadiene-styrene copolymer has a notched Izod impact strength of 80 joules/meter, compared to values of 85-96 joules per meter for Examples 7-11 containing 0.28-1.12 weight percent acrylonitrile residues derived from acrylonitrile-butadiene-styrene copolymer. Also, Comparative Example 5 with 1.68 weight percent acrylonitrile residues derived from a mixture of styrene-acrylonitrile and acrylonitrile-butadiene-styrene copolymers has a notched Izod impact strength of 71 joules/meter, compared to values of 81-92 joules per meter for Examples 12-14 containing 0.28-1.12 weight percent acrylonitrile residues derived from a mixture of styrene-acrylonitrile and acrylonitrile-butadiene-styrene copolymers.

TABLE 5

|  | C. Ex. 1 | Ex. 1 | Ex. 2 | Ex. 3 | Ex. 4 |
|---|---|---|---|---|---|
| COMPOSITIONS | | | | | |
| PPE masterbatch | 68.58 | 68.58 | 68.58 | 68.58 | 68.58 |
| P. Ex. 1 | 18.66 | 0 | 0 | 0 | 0 |
| P. Ex. 2 | 0 | 18.66 | 0 | 0 | 0 |
| P. Ex. 3 | 0 | 0 | 18.66 | 0 | 0 |
| P. Ex. 4 | 0 | 0 | 0 | 18.66 | 0 |
| P. Ex. 5 | 0 | 0 | 0 | 0 | 18.66 |
| P. Ex. 6 | 0 | 0 | 0 | 0 | 0 |

TABLE 5-continued

| | | | | | |
|---|---|---|---|---|---|
| P. Ex. 7 | 0 | 0 | 0 | 0 | 0 |
| P. Ex. 8 | 0 | 0 | 0 | 0 | 0 |
| P. Ex. 9 | 0 | 0 | 0 | 0 | 0 |
| P. Ex. 10 | 0 | 0 | 0 | 0 | 0 |
| P. Ex. 11 | 0 | 0 | 0 | 0 | 0 |
| P. Ex. 12 | 0 | 0 | 0 | 0 | 0 |
| P. Ex. 13 | 0 | 0 | 0 | 0 | 0 |
| P. Ex. 14 | 0 | 0 | 0 | 0 | 0 |
| P. Ex. 15 | 0 | 0 | 0 | 0 | 0 |
| P. Ex. 16 | 0 | 0 | 0 | 0 | 0 |
| P. Ex. 17 | 0 | 0 | 0 | 0 | 0 |
| P. Ex. 18 | 0 | 0 | 0 | 0 | 0 |
| P. Ex. 19 | 0 | 0 | 0 | 0 | 0 |
| BPADP | 12.76 | 12.76 | 12.76 | 12.76 | 12.76 |
| total | 100.00 | 100.00 | 100.00 | 100.00 | 100.00 |
| PPE | 66.95 | 66.95 | 66.95 | 66.95 | 66.95 |
| HIPS | 18.66 | 18.20 | 17.73 | 16.80 | 14.93 |
| ABS | 0.00 | 0.00 | 0.00 | 0.00 | 0.00 |
| SAN | 0.00 | 4.67 | 0.93 | 1.87 | 3.73 |
| ABS + SAN | 0.00 | 4.67 | 0.93 | 1.87 | 3.73 |
| ABS:SAN | 0:0 | 0:1 | 0:1 | 0:1 | 0:1 |
| AN residue | 0.00 | 1.40 | 0.28 | 0.56 | 1.12 |
| PROPERTIES | | | | | |
| Tensile stress at yield (MPa) | 75 | 75 | 76 | 76 | 77 |
| Tensile stress at break (MPa) | 56 | 57 | 56 | 53 | 57 |
| Tensile elongation at yield (%) | 5 | 5 | 5 | 5 | 5 |
| Tensile elongation at break (%) | 14 | 17 | 15 | 11 | 16 |
| Modulus of elasticity (MPa) | 2712 | 2730 | 2678 | 2634 | 2764 |
| Flexural modulus (MPa) | 2870 | 2870 | 2870 | 2870 | 2880 |
| Notched Izod (J/m) | 91 | 93 | 89 | 82 | 72 |
| Total energy (J) | 25 | 39 | 33 | 44 | 25 |
| Heat deflection temperature (° C.) | 120 | 121 | 122 | 122 | 125 |

| | C. Ex. 2 | Ex. 5 | Ex. 6 | C. Ex. 3 | Ex. 7 |
|---|---|---|---|---|---|
| COMPOSITIONS | | | | | |
| PPE masterbatch | 68.58 | 68.58 | 68.58 | 68.58 | 68.58 |
| P. Ex. 1 | 0 | 0 | 0 | 0 | 0 |
| P. Ex. 2 | 0 | 0 | 0 | 0 | 0 |
| P. Ex. 3 | 0 | 0 | 0 | 0 | 0 |
| P. Ex. 4 | 0 | 0 | 0 | 0 | 0 |
| P. Ex. 5 | 0 | 0 | 0 | 0 | 0 |
| P. Ex. 6 | 18.66 | 0 | 0 | 0 | 0 |
| P. Ex. 7 | 0 | 18.66 | 0 | 0 | 0 |
| P. Ex. 8 | 0 | 0 | 18.66 | 0 | 0 |
| P. Ex. 9 | 0 | 0 | 0 | 18.66 | 0 |
| P. Ex. 10 | 0 | 0 | 0 | 0 | 18.66 |
| P. Ex. 11 | 0 | 0 | 0 | 0 | 0 |
| P. Ex. 12 | 0 | 0 | 0 | 0 | 0 |
| P. Ex. 13 | 0 | 0 | 0 | 0 | 0 |
| P. Ex. 14 | 0 | 0 | 0 | 0 | 0 |
| P. Ex. 15 | 0 | 0 | 0 | 0 | 0 |
| P. Ex. 16 | 0 | 0 | 0 | 0 | 0 |
| P. Ex. 17 | 0 | 0 | 0 | 0 | 0 |
| P. Ex. 18 | 0 | 0 | 0 | 0 | 0 |
| P. Ex. 19 | 0 | 0 | 0 | 0 | 0 |
| BPADP | 12.76 | 12.76 | 12.76 | 12.76 | 12.76 |
| total | 100.00 | 100.00 | 100.00 | 100.00 | 100.00 |
| PPE | 66.95 | 66.95 | 66.95 | 66.95 | 66.95 |
| HIPS | 13.07 | 17.73 | 16.80 | 18.20 | 17.73 |
| ABS | 0.00 | 0.00 | 0.00 | 0.47 | 0.93 |
| SAN | 5.60 | 0.93 | 1.87 | 0.00 | 0.00 |
| ABS + SAN | 5.60 | 0.93 | 1.87 | 0.47 | 0.93 |
| ABS:SAN | 0:1 | 0:1 | 0:1 | 1:0 | 1:0 |
| AN residue | 1.68 | 0.28 | 0.56 | 0.14 | 0.28 |
| PROPERTIES | | | | | |
| Tensile stress at yield (MPa) | 74 | 76 | 76 | 75 | 75 |
| Tensile stress at break (MPa) | 74 | 59 | 59 | 60 | 56 |
| Tensile elongation at yield (%) | 4 | 5 | 5 | 5 | 5 |
| Tensile elongation at break (%) | 4 | 9 | 10 | 11 | 9 |
| Modulus of elasticity (MPa) | 2832 | 2822 | 2846 | 2774 | 2780 |
| Flexural modulus (MPa) | 2890 | 2860 | 2900 | 2860 | 2840 |
| Notched Izod (J/m) | 58 | 89 | 85 | 92 | 93 |
| Total energy (J) | 4 | 27 | 44 | 35 | 33 |
| Heat deflection temperature (° C.) | 127 | 123 | 123 | 121 | 120 |

| | Ex. 8 | Ex. 9 | C. Ex. 4 | Ex. 10 | Ex. 11 |
|---|---|---|---|---|---|
| COMPOSITIONS | | | | | |
| PPE masterbatch | 68.58 | 68.58 | 68.58 | 68.58 | 68.58 |
| P. Ex. 1 | 0 | 0 | 0 | 0 | 0 |
| P. Ex. 2 | 0 | 0 | 0 | 0 | 0 |
| P. Ex. 3 | 0 | 0 | 0 | 0 | 0 |
| P. Ex. 4 | 0 | 0 | 0 | 0 | 0 |
| P. Ex. 5 | 0 | 0 | 0 | 0 | 0 |
| P. Ex. 6 | 0 | 0 | 0 | 0 | 0 |
| P. Ex. 7 | 0 | 0 | 0 | 0 | 0 |
| P. Ex. 8 | 0 | 0 | 0 | 0 | 0 |
| P. Ex. 9 | 0 | 0 | 0 | 0 | 0 |
| P. Ex. 10 | 0 | 0 | 0 | 0 | 0 |
| P. Ex. 11 | 18.66 | 0 | 0 | 0 | 0 |
| P. Ex. 12 | 0 | 18.66 | 0 | 0 | 0 |
| P. Ex. 13 | 0 | 0 | 18.66 | 0 | 0 |
| P. Ex. 14 | 0 | 0 | 0 | 18.66 | 0 |
| P. Ex. 15 | 0 | 0 | 0 | 0 | 18.66 |
| P. Ex. 16 | 0 | 0 | 0 | 0 | 0 |
| P. Ex. 17 | 0 | 0 | 0 | 0 | 0 |
| P. Ex. 18 | 0 | 0 | 0 | 0 | 0 |
| P. Ex. 19 | 0 | 0 | 0 | 0 | 0 |
| BPADP | 12.76 | 12.76 | 12.76 | 12.76 | 12.76 |
| total | 100.00 | 100.00 | 100.00 | 100.00 | 100.00 |
| PPE | 66.95 | 66.95 | 66.95 | 66.95 | 66.95 |
| HIPS | 16.80 | 14.93 | 13.07 | 17.73 | 16.80 |
| ABS | 1.87 | 3.73 | 5.60 | 0.93 | 1.87 |
| SAN | 0.00 | 0.00 | 0.00 | 0.00 | 0.00 |
| ABS + SAN | 1.87 | 3.73 | 5.60 | 0.93 | 1.87 |
| ABS:SAN | 1:0 | 1:0 | 1:0 | 1:0 | 1:0 |
| AN residue | 0.56 | 1.12 | 1.68 | 0.28 | 0.56 |
| PROPERTIES | | | | | |
| Tensile stress at yield (MPa) | 76 | 75 | 75 | 76 | 76 |
| Tensile stress at break (MPa) | 57 | 56 | 57 | 56 | 55 |
| Tensile elongation at yield (%) | 5 | 5 | 5 | 5 | 5 |
| Tensile elongation at break (%) | 15 | 16 | 15 | 12 | 13 |
| Modulus of elasticity (MPa) | 2846 | 2828 | 2797 | 2790 | 2790 |
| Flexural modulus (MPa) | 2840 | 2820 | 2800 | 2860 | 2850 |
| Notched Izod (J/m) | 90 | 85 | 80 | 96 | 92 |
| Total energy (J) | 37 | 53 | 38 | 52 | 34 |
| Heat deflection temperature (° C.) | 123 | 122 | 124 | 122 | 123 |

| | Ex. 12 | Ex. 13 | Ex. 14 | C. Ex. 5 |
|---|---|---|---|---|
| COMPOSITIONS | | | | |
| PPE masterbatch | 68.58 | 68.58 | 68.58 | 68.58 |
| P. Ex. 1 | 0 | 0 | 0 | 0 |
| P. Ex. 2 | 0 | 0 | 0 | 0 |
| P. Ex. 3 | 0 | 0 | 0 | 0 |
| P. Ex. 4 | 0 | 0 | 0 | 0 |
| P. Ex. 5 | 0 | 0 | 0 | 0 |
| P. Ex. 6 | 0 | 0 | 0 | 0 |
| P. Ex. 7 | 0 | 0 | 0 | 0 |
| P. Ex. 8 | 0 | 0 | 0 | 0 |
| P. Ex. 9 | 0 | 0 | 0 | 0 |

TABLE 5-continued

| | | | | |
|---|---|---|---|---|
| P. Ex. 10 | 0 | 0 | 0 | 0 |
| P. Ex. 11 | 0 | 0 | 0 | 0 |
| P. Ex. 12 | 0 | 0 | 0 | 0 |
| P. Ex. 13 | 0 | 0 | 0 | 0 |
| P. Ex. 14 | 0 | 0 | 0 | 0 |
| P. Ex. 15 | 0 | 0 | 0 | 0 |
| P. Ex. 16 | 18.66 | 0 | 0 | 0 |
| P. Ex. 17 | 0 | 18.66 | 0 | 0 |
| P. Ex. 18 | 0 | 0 | 18.66 | 0 |
| P. Ex. 19 | 0 | 0 | 0 | 18.66 |
| BPADP | 12.76 | 12.76 | 12.76 | 12.76 |
| total | 100.00 | 100.00 | 100.00 | 100.00 |
| PPE | 66.95 | 66.95 | 66.95 | 66.95 |
| HIPS | 17.73 | 16.80 | 14.93 | 13.07 |
| ABS | 0.47 | 0.93 | 1.87 | 2.80 |
| SAN | 0.47 | 0.93 | 1.87 | 2.80 |
| ABS + SAN | 0.93 | 1.87 | 3.73 | 5.60 |
| ABS:SAN | 1:1 | 1:1 | 1:1 | 1:1 |
| AN residue | 0.28 | 0.56 | 1.12 | 1.68 |
| PROPERTIES | | | | |
| Tensile stress at yield (MPa) | 76 | 77 | 77 | 76 |
| Tensile stress at break (MPa) | 58 | 59 | 54 | 58 |
| Tensile elongation at yield (%) | 5 | 5 | 5 | 6 |
| Tensile elongation at break (%) | 13 | 16 | 17 | 15 |
| Modulus of elasticity (MPa) | 2882 | 2590 | 2790 | 2464 |
| Flexural modulus (MPa) | 2860 | 2850 | 2840 | 2850 |
| Notched Izod (J/m) | 92 | 88 | 81 | 71 |
| Total energy (J) | 39 | 32 | 37 | 7 |
| Heat deflection temperature (° C.) | 121 | 123 | 124 | 126 |

Examples 15 and 16

Comparative Example 6

Two inventive compositions and one comparative composition were prepared to explore the effect of recycling-related impurities on the flame retardancy of blends of poly(arylene ether) and rubber-modified polystyrene.

Compositions were compounded and molded as described for Examples 1-14 and Comparative Examples 1-5. Compositions and properties are summarized in Table 6, where components amounts are in weight percent based on the total weight of the composition.

Flame retardancy of injection molded flame bars was determined according to Underwriter's Laboratory Bulletin 94 "Tests for Flammability of Plastic Materials, UL 94", 20 mm Vertical Burning Flame Test. Before testing, flame bars with a thickness of 1.5 millimeters were conditioned at either 23° C. and 50% relative humidity for 48 hours, or 70° C. and 50% relative humidity for 168 hours. In the UL 94 20 mm Vertical Burning Flame Test, a set of five flame bars is tested. For each bar, a flame is applied to the bar then removed, and the time required for the bar to self-extinguish (first afterflame time, t1) is noted. The flame is then reapplied and removed, and the time required for the bar to self-extinguish (second afterflame time, t2) and the post-flame glowing time (afterglow time, t3) are noted. Among the requirements for a rating of V-0, the afterflame times t1 and t2 for each individual specimen must be less than or equal to 10 seconds, and the total afterflame time for all five specimens (t1 plus t2 for all five specimens) must be less than or equal to 50 seconds. Among the requirements for a rating of V-1 or V-2, the afterflame times t1 and t2 for each individual specimen must be less than or equal to 30 seconds, and the total afterflame time for all five specimens (t1 plus t2 for all five specimens) must be less than or equal to 250 seconds.

Comparing Comparative Example 6 with Example 15 shows that substitution of post-consumer-recycled rubber-modified polystyrene for virgin rubber-modified polystyrene is associated with a slight reduction in flame retardancy. Example 16 shows that it is possible to compensate for this effect by adding a small additional amount of flame retardant.

TABLE 6

| | C. Ex. 6 | Ex. 15 | Ex. 16 |
|---|---|---|---|
| COMPOSITIONS | | | |
| PPE 0.3 | 42.40 | 42.40 | 45.38 |
| TSAN | 0.30 | 0.30 | 0.30 |
| LLDPE | 1.20 | 1.20 | 1.20 |
| MgO | 0.10 | 0.10 | 0.10 |
| ZnS | 0.10 | 0.10 | 0.10 |
| Phosphite | 0.08 | 0.08 | 0.08 |
| Pigment black 7 | 1.48 | 1.48 | 1.48 |
| PCR HIPS | 0.00 | 41.35 | 37.00 |
| HF HIPS | 41.35 | 0.00 | 0.00 |
| BPADP | 13.00 | 13.00 | 14.38 |
| total | 100.00 | 100.00 | 100.00 |
| AN residue | 0.045 | 0.442 | 0.400 |
| PROPERTIES | | | |
| Flame-out times after sample conditioning at 23° C./50% RH for 48 hours | | | |
| sample 1, t1 | 5.8 | 2.7 | 3.0 |
| sample 2, t1 | 3.2 | 2.0 | 5.5 |
| sample 3, t1 | 2.0 | 3.9 | 6.3 |
| sample 4, t1 | 1.1 | 6.6 | 2.2 |
| sample 5, t1 | 3.0 | 6.7 | 2.0 |
| sample 1, t2 | 8.8 | 10.4 | 4.4 |
| sample 2, t2 | 6.9 | 3.5 | 7.0 |
| sample 3, t2 | 21.3 | 15.2 | 3.2 |
| sample 4, t2 | 8.2 | 12.6 | 5.9 |
| sample 5, t2 | 3.5 | 8.0 | 6.8 |
| sample 6, t1 | 2.3 | 4.0 | 2.4 |
| sample 7, t1 | 12.8 | 9.7 | 3.1 |
| sample 8, t1 | 3.6 | 3.3 | 7.7 |
| sample 9, t1 | 1.5 | 6.8 | 7.1 |
| sample 10, t1 | 1.9 | 6.1 | 2.7 |
| sample 6, t2 | 3.3 | 15.2 | 6.4 |
| sample 7, t2 | 2.2 | 5.2 | 2.7 |
| sample 8, t2 | 3.1 | 20.2 | 6.6 |
| sample 9, t2 | 5.3 | 2.1 | 4.9 |
| sample 10, t2 | 3.8 | 3.0 | 3.6 |
| Flame-out times after sample conditioning at 70° C./50% RH for 168 hours | | | |
| sample 1, t1 | 1.7 | 1.7 | 1.9 |
| sample 2, t1 | 1.8 | 9.8 | 1.9 |
| sample 3, t1 | 1.8 | 18.8 | 2.6 |
| sample 4, t1 | 2.3 | 1.6 | 1.8 |
| sample 5, t1 | 1.5 | 1.6 | 1.9 |
| sample 1, t2 | 1.8 | 58.2 | 3.1 |
| sample 2, t2 | 6.9 | 4.0 | 26.3 |
| sample 3, t2 | 4.3 | 3.5 | 2.9 |
| sample 4, t2 | 5.6 | 21.1 | 2.8 |
| sample 5, t2 | 3.9 | 2.5 | 5.0 |
| sample 6, t1 | 2.7 | 2.6 | 1.7 |
| sample 7, t1 | 2.4 | 4.2 | 1.8 |
| sample 8, t1 | 1.1 | 0.8 | 1.8 |
| sample 9, t1 | 1.6 | 32.4 | 2.1 |
| sample 10, t1 | 1.2 | 2.5 | 0.7 |
| sample 6, t2 | 3.1 | 25.6 | 7.6 |
| sample 7, t2 | 3.7 | 2.6 | 6.1 |
| sample 8, t2 | 4.8 | 7.5 | 2.5 |
| sample 9, t2 | 1.2 | 1.5 | 28.3 |
| sample 10, t2 | 2.0 | 4.4 | 2.8 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition comprising:
   about 30 to about 60 weight percent of a poly(arylene ether) consisting of virgin poly(arylene ether);
   about 20 to about 55 weight percent of a rubber-modified polystyrene; and
   about 0.2 to about 1.5 weight percent of polymerized acrylonitrile residue;
   wherein the composition comprises 0 to 3 weight percent of a copolymer of an ethylenically unsaturated epoxy compound and an olefin; and
   wherein all weight percents are based on the total weight of the composition, unless a different basis is specified.

2. The composition of claim 1, wherein the rubber-modified polystyrene and the polymerized acrylonitrile residue are provided in the form of a post-consumer recycled rubber-modified polystyrene comprising styrene-acrylonitrile copolymer, acrylonitrile-butadiene-styrene copolymer, or a mixture thereof.

3. The composition of claim 1, further comprising about 1 to about 25 weight percent of a flame retardant.

4. The composition of claim 3, wherein the flame retardant comprises an organophosphate ester.

5. The composition of claim 1, excluding polyamides.

6. A method of forming a composition, comprising:
   melt blending components comprising
      about 30 to about 60 weight percent of a poly(arylene ether) consisting of virgin poly(arylene ether),
      about 20 to about 55 weight percent of a rubber-modified polystyrene, and
      about 0.2 to about 1.5 weight percent of polymerized acrylonitrile residue to form the composition;
   wherein the composition comprises 0 to 3 weight percent of a copolymer of an ethylenically unsaturated epoxy compound and an olefin; and
   wherein all weight percents are based on the total weight of the composition, unless a different basis is specified.

7. The method of claim 6, wherein the rubber-modified polystyrene and the polymerized acrylonitrile residue are provided in the form of a post-consumer recycled rubber-modified polystyrene comprising styrene-acrylonitrile copolymer, acrylonitrile-butadiene-styrene copolymer, or a mixture thereof.

8. The method of claim 6, wherein the composition further comprises about 1 to about 25 weight percent of a flame retardant.

9. The method of claim 8, wherein the flame retardant comprises an organophosphate ester.

10. The method of claim 6, wherein the composition excludes polyamides.

11. The method of claim 6,
    wherein the composition comprises
       about 40 to about 50 weight percent of the poly(arylene ether),
       about 32 to about 40 weight percent of the rubber-modified polystyrene, and
       about 0.25 to about 1 weight percent of the polymerized acrylonitrile residue;
    wherein the composition further comprises about 10 to about 20 weight percent of an organophosphate ester;
    wherein the rubber-modified polystyrene and the polymerized acrylonitrile residue are provided in the form of a post-consumer recycled rubber-modified polystyrene; and
    wherein the composition excludes polyamides.

12. The method of claim 11, wherein the composition consists of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

13. A composition formed by the method of claim 6.

14. The composition of claim 13, wherein the rubber-modified polystyrene and the polymerized acrylonitrile residue are provided in the form of a post-consumer recycled rubber-modified polystyrene comprising styrene-acrylonitrile copolymer, acrylonitrile-butadiene-styrene copolymer, or a mixture thereof.

15. The composition of claim 13, further comprising about 1 to about 25 weight percent of a flame retardant.

16. The composition of claim 15, wherein the flame retardant comprises an organophosphate ester.

17. The composition of claim 13, excluding polyamides.

18. The composition of claim 13,
    wherein the composition comprises
       about 40 to about 50 weight percent of the poly(arylene ether),
       about 32 to about 40 weight percent of the rubber-modified polystyrene, and
       about 0.25 to about 1 weight percent of the polymerized acrylonitrile residue;
    wherein the composition further comprises about 10 to about 20 weight percent of an organophosphate ester;
    wherein the rubber-modified polystyrene and the polymerized acrylonitrile residue are provided in the form of a post-consumer recycled rubber-modified polystyrene; and
    wherein the composition excludes polyamides.

19. The composition of claim 18, consisting of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

20. An injection molded article comprising the composition of claim 1.

21. The injection molded article of claim 20, wherein the rubber-modified polystyrene and the polymerized acrylonitrile residue are provided in the form of a post-consumer recycled rubber-modified polystyrene comprising styrene-acrylonitrile copolymer, acrylonitrile-butadiene-styrene copolymer, or a mixture thereof.

22. The injection molded article of claim 20, further comprising about 1 to about 25 weight percent of a flame retardant.

23. The injection molded article of claim 22, wherein the flame retardant comprises an organophosphate ester.

24. The injection molded article of claim 20, excluding polyamides.

25. The injection molded article of claim 20,
wherein the composition comprises
about 40 to about 50 weight percent of the poly(arylene ether),
about 32 to about 40 weight percent of the rubber-modified polystyrene, and
about 0.25 to about 1 weight percent of polymerized acrylonitrile residue;
wherein the composition further comprises about 10 to about 20 weight percent of an organophosphate ester;
wherein the rubber-modified polystyrene and the polymerized acrylonitrile residue are provided in the form of a post-consumer recycled rubber-modified polystyrene; and
wherein the composition excludes polyamides.

26. The injection molded article of claim 25, wherein the composition consists of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

27. The composition of claim 1,
wherein the composition comprises
about 40 to about 50 weight percent of the poly(arylene ether),
about 32 to about 40 weight percent of the rubber-modified polystyrene, and
about 0.25 to about 1 weight percent of the polymerized acrylonitrile residue;
wherein the composition further comprises about 10 to about 20 weight percent of an organophosphate ester;
wherein the rubber-modified polystyrene and the polymerized acrylonitrile residue are provided in the form of a post-consumer recycled rubber-modified polystyrene; and
wherein the composition excludes polyamides.

28. The composition of claim 27, consisting of the virgin poly(arylene ether), the post-consumer recycled rubber-modified polystyrene, the organophosphate ester, and, optionally, up to 5 weight percent of additives selected from the group consisting of stabilizers, antioxidants, mold release agents, processing aids, drip retardants, nucleating agents, UV blockers, fragrances, anti-static agents, mineral oil, metal deactivators, antiblocking agents, and combinations thereof.

29. The composition of claim 1, excluding the copolymer of an ethylenically unsaturated epoxy compound and an olefin.

* * * * *